United States Patent
Pierce

[11] 3,898,318
[45] Aug. 5, 1975

[54] SILICATE DISSOLVING
[75] Inventor: Richard H. Pierce, Broomall, Pa.
[73] Assignee: Philadelphia Quartz Company, Valley Forge, Pa.
[22] Filed: Nov. 14, 1973
[21] Appl. No.: 415,899

[52] U.S. Cl. .............................. 423/332; 23/270 R
[51] Int. Cl. ...................... B01d 11/02; C01b 33/32
[58] Field of Search ............ 23/293 R, 313 AS, 272, 23/272.6 R, 272.6 S, 270; 423/201, 203, 205, 208, 332

[56] References Cited
UNITED STATES PATENTS

| | | | |
|---|---|---|---|
| 445,091 | 1/1891 | Sievert | 423/332 |
| 1,176,613 | 3/1916 | Spensley | 423/332 |
| 1,357,183 | 10/1920 | Phillips | 423/332 |
| 1,443,674 | 1/1923 | Blanc | 23/313 AS |
| 1,467,342 | 9/1923 | Taylor | 23/272.6 R |
| 1,763,845 | 6/1930 | Edgerton | 23/272.6 R |
| 2,086,230 | 7/1937 | Semmerman | 423/332 |
| 2,251,515 | 8/1941 | Curll | 23/313 AS |
| 2,604,417 | 7/1952 | Silver | 23/270 R |
| 2,783,129 | 2/1957 | Baral | 423/332 |
| 2,792,289 | 5/1957 | Wilson | 23/270 R |
| 3,077,389 | 2/1963 | Schulze | 23/313 AS |
| 3,090,679 | 5/1963 | Tauch | 23/313 AS |
| 3,346,335 | 10/1967 | Schnurch | 23/313 AS |
| 3,537,815 | 11/1970 | Burke | 23/313 AS |

FOREIGN PATENTS OR APPLICATIONS
781,207 8/1957 United Kingdom............ 23/313 AS
272,273 2/1966 U.S.S.R.......................... 23/313 AS OTHER PUBLICATIONS
Perry, Chemical Engineer's Handbook, 3rd. Ed., 1950, pp. 716 to 718.

Primary Examiner—A. Louis Monacell
Assistant Examiner—S. J. Emery
Attorney, Agent, or Firm—Fred Philpitt; Ernest Posner

[57] ABSTRACT

Solutions of soluble alkali metal silicates of exceptional clarity are prepared by dissolving anhydrous alkali metal silicate glass at atmospheric pressure by a novel process comprising the constant classification of alkali metal silicate glass particles according to size and the constant removal of the polymer-like silicate that forms as a semi-solid on the wetted glass surface. The constant classification of the silicate glass particles and removal of this polymeric silicate to yield nascent glass surfaces can be achieved by charging silicate glass particles to aqueous media in a vibrating or vibro energy mill and subjecting said particles to impacts of varying frequency and amplitude or by subjecting the solution and glass particles, during dissolution, to agitation of different intensity and duration in a vertically stacked series of dissolving chambers.

7 Claims, 3 Drawing Figures

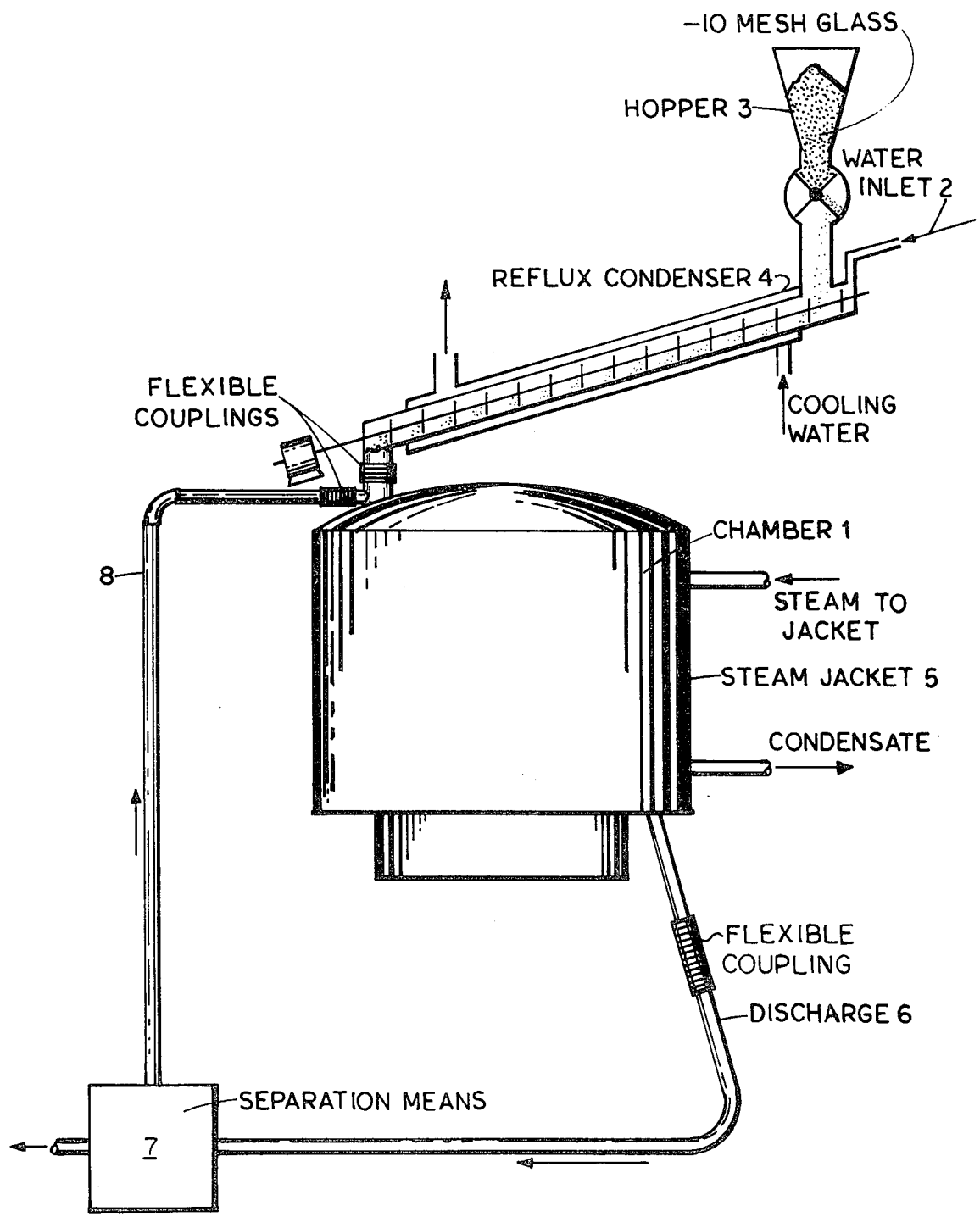

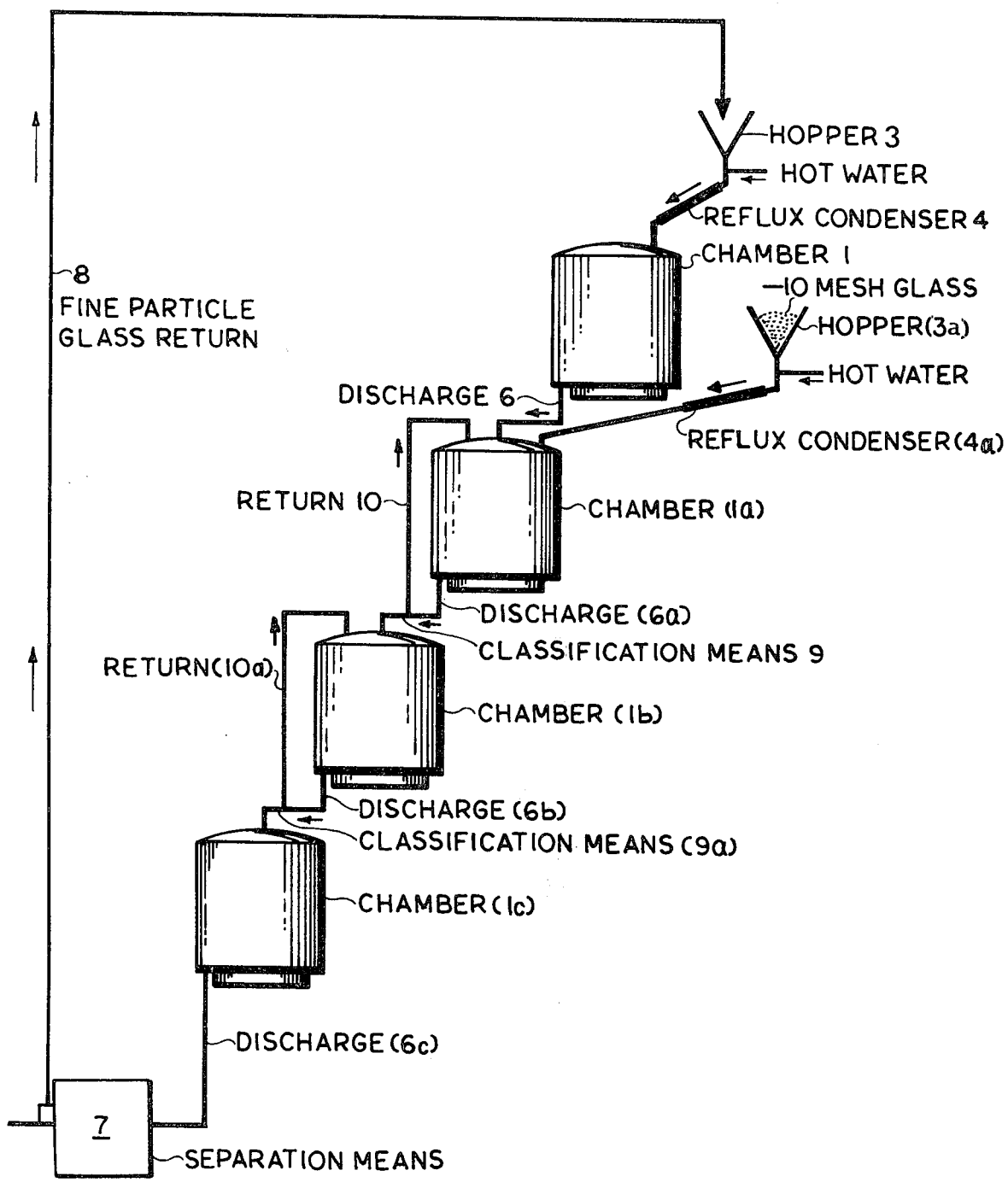

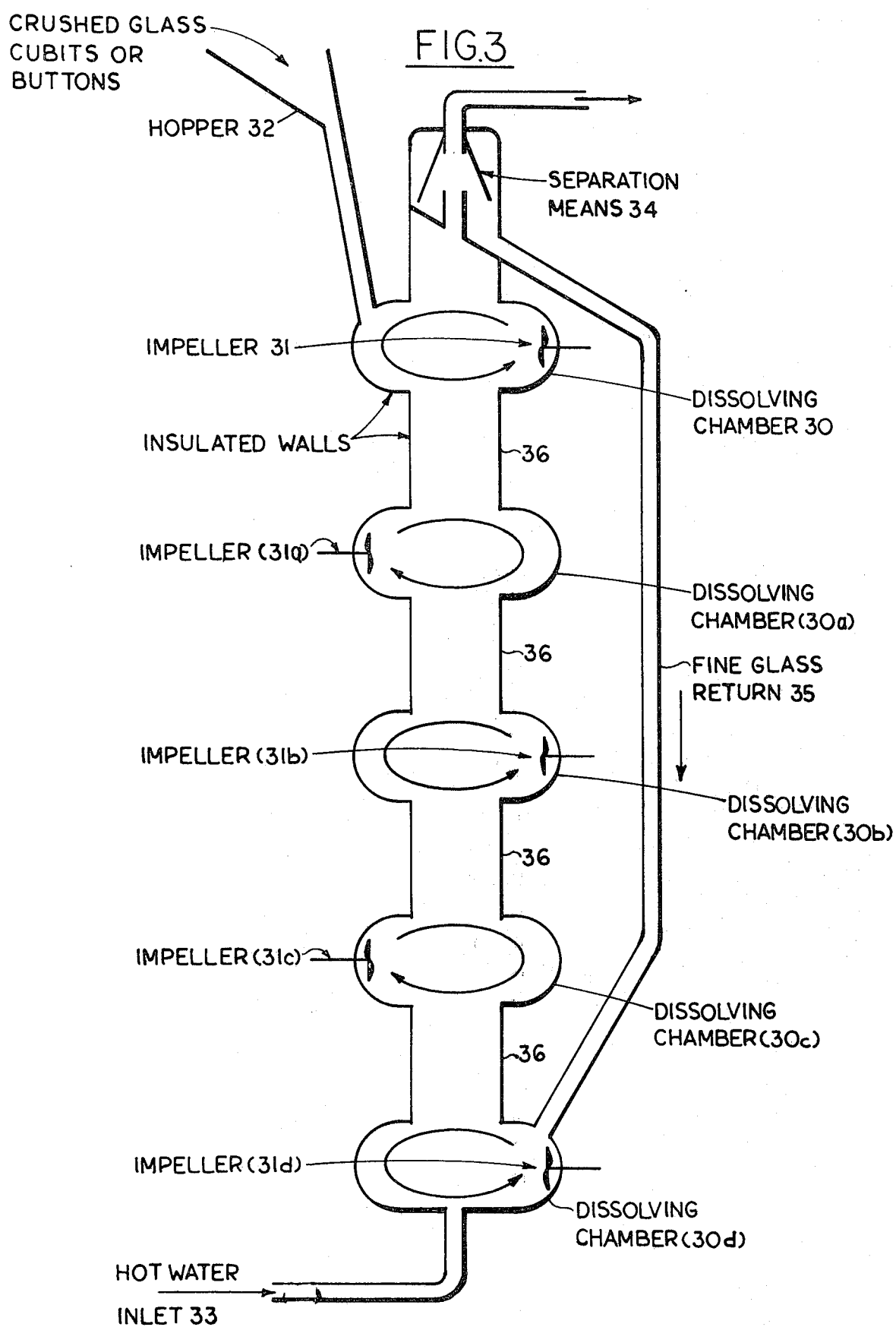

SILICATE DISSOLVING

BACKGROUND OF THE INVENTION

The dissolution of alkali metal silicate glass to form solutions of sufficient concentration to have commercial value has long been recognized as the most difficult step in preparing such solutions. The first step in dissolving is an ion exchange between the alkali metal ions on the surface of the glass and hydrogen ions of the aqueous phase. The aqueous phase becomes alkaline and a layer of silanol groups is formed on the glass surface. The second stage of dissolving involves depolymerization and diffusion of the silicate ion into the bulk of the solution. To effect this depolymerization and diffusion, water and ions must penetrate the glass. However, the silanol groups formed by the ion exchange step resemble a polymer in their protective resistance to penetration and diffusion. As a consequence of such behavior silanol groups, silicate ions and water are retained on the glass surface as a semisolid. Until now, high temperatures and pressures as well as excess glass and prolonged dissolving times have been necessary to produce silicate solutions of commercial value. The use of such extreme conditions produces solutions that are cloudy and must be filtered or settled for long periods of time to attain a clear solution. Dissolving and treating of silicate glass in ball mills and the like to achieve faster dissolution has been suggested; however, these solutions are quite turbid and usually contain impurities from the mill.

I have found that if the protective layer consisting of silanol groups, silicate ions and water can be continuously removed and diffused away from the glass surface constantly exposing nascent glass surfaces, alkali metal silicate solutions of commercial concentration can be formed after short dissolving times, at temperatures below the boiling points of water or of the silicate solutions formed and at atmospheric pressure. The resulting solutions are clear and need not be filtered or settled.

SUMMARY OF THE INVENTION

The dissolving of alkali metal silicate glass to form clear concentrated solutions, is carried out at atmospheric pressures and temperatures below about 102°C by constant removal and diffusion of the polymer-like silanol groups that form on the surface of the glass thereby exposing nascent glass surfaces that can be attacked and penetrated by water and ions. This constant removal can be accomplished by conducting the dissolution in aqueous media in a vibro energy mill, a series of vibro energy mills or in a vertically stacked series of dissolving chambers. By using these devices it is possible to classify the glass particles according to size and subject them to the treatment needed to effect diffusion of the silicate ions from the surface of the glass and promote penetration of the nascent glass surface thus exposed. The vibro energy mill supplies gentle rubbing or abrasive action promoting diffusion of the semi-solid material from the surface of the glass thereby cleansing the surface and exposing a nascent glass surface. The new patentable apparatus comprising a vertical stack of dissolving chambers subjects the increasingly smaller glass particles to silicate solutions of lower and lower concentration. This arrangement provides needed high diffusive forces and the mechanical means to treat the smaller particles which are harder to affect and exhibit more powerful attractive forces for the semi-solid material formed on the glass surface. The primary objective of this invention is to produce clear alkali metal silicate solutions by dissolving alkali metal silicate glass in such a manner that the exposure time of the silicate species to elevated temperatures is at a minimum and the dissolution is conducted at atmospheric pressure.

BRIEF DESCRIPTION OF THE DRAWINGS

FIG. 1 is a section of a particular vibro energy mill with an annular chamber 1. The chamber is charged with about 45 to 75% of its capacity with energy transfer media, for example cylinders of alumina, and the required amount of aqueous media. Silicate glass particles are fed through hopper 3 to reflux condenser 4 equipped with a screw conveyor which in turn feeds into chamber 1. The alkali metal silicate solution and any undissolved glass particles are discharged through 6 to a separation means 7 such as a filter, screen or centrifuge and the fine glass particles are recycled through return 8.

FIG. 2 shows a preferred embodiment of the invention involving a series or train of vibro energy mills such as is shown in FIG. 1. Silicate glass particles of about 10 mesh or smaller are fed through hopper 3a into reflux condenser 4a which in turn feeds chamber 1a. The discharges from chambers 1a and 1b are conducted through a means for classification 9 and 9a respectively and the glass particles that do not pass through said means for classification are returned to chambers 1a and 1b by returns 10 and 10a. The discharge from final chamber 1c is passed through a means for separation 7 such as a filter or a centrifuge to remove fine glass particles, such particles are recycled through return 8 to hopper 3 and subsequently fed to chamber 1.

FIG. 3 also illustrates a preferred embodiment of the invention. The dissolver consists of a series of agitated dissolving chambers arranged vertically and connected by sections of vertical tube 36 which permits passage of undissolved glass larger than 325 mesh downward and silicate solution with some entrained undissolved glass particles smaller than 325 mesh upward. Crushed glass is charged to the top chamber 30 through hopper 32 while hot water is injected into the system through inlet 33. The impellers 31 through 31d supply agitation. The alkali metal silicate solution with any entrained undissolved glass particles is discharged to a means for separation such as a centrifuge 34 and the separated fine glass particles are recycled to chamber 30d through return 35.

THE INVENTION

The anhydrous alkali metal silicate glasses dissolved utilizing the apparatus of this invention can be prepared in any manner but are most commonly produced by the fusion of alkali metal carbonates with sand. The $SiO_2/M_2O$ mole ratio of the glass can vary between 1.2/1.0 and 3.8/1.0 where M stands for an alkali metal or combination of alkali metals. Most commonly sodium silicate and potassium silicate glasses are dissolved but sodium-potassium double silicate glasses are also useful. Such double silicate glasses can be prepared by the fusion of sodium and potassium carbonates with silica sand.

Chunks of glass larger than ½ inch can be used but some advantage is found in dissolving smaller particles of glass. Silicate glasses that have been ground or crushed in ball, jaw or hammer mills or the like can be dissolved using the processes of this invention. Glasses that are sub-divided by thermal stressing, as described in U.S. Pat. No. 3,734,756 are also highly desirable starting materials for the process of this invention. Other physical forms of glass prepared by manipulation of molten glass are also useful.

The dissolving is carried out at temperatures above 80°C and preferably above 95°C but the temperature should not be above the boiling point of water or the solutions formed. The boiling points of water and the dilute solutions are about 100°C. while more concentrated solutions have boiling points of about 102°C. Therefore, the temperatures during the initial part of the dissolution can approach 100°C. while the temperatures at later stages of the dissolution can approach 102°C.

Prior art methods of dissolving alkali metal silicate glass generally involve long periods of time to dissolve sufficient material to form solutions of commercial concentrations. Therefore, the time during which the silicate is exposed to high temperature is of sufficient duration to form opaque silica particles which remain suspended in the finished solution and must be filtered out. The process of my invention does not involve long periods of time or high pressures and therefore such opaque silica particles do not form. The entire dissolving operation can be completed in 30 minutes and preferably can be completed in 15 to 20 minutes by the process of my invention. Any water and most of the silicate glass entering a vessel, or train of vessels or chambers according to this invention is discharged as concentrated silicate solution in less than 30 minutes and usually less than 20 minutes. Most preferably this process allows essentially complete dissolution of the glass in 15 to 20 minutes. These times contrast favorably with the dissolving times for other dissolvers particularly continuous dissolvers.

The key to achieving rapid dissolution of alkali metal silicate glass at temperatures attained at atmospheric pressure without boiling and in less than 30 minutes is the removal and diffusion of the semi-solid composed of silanol and silicate ions that form upon the glass surface on exposure to water. The removal and diffusion of this material from the glass surface takes place rather rapidly when the glass is first exposed to water; however, as the silicate glass particles become smaller and the silicate solution becomes more concentrated the separation is drastically reduced and more energy is required to achieve the desired effect on such particles. I have found that by classifying the silicate glass as to particle size I can meet the necessary energy requirements based on the size of the classified particles and thereby diffuse and/or remove the semi-solid material, that forms on the glass surface, in an efficient manner. A nascent glass surface will be constantly exposed and an efficient dissolution takes place at the conditions described above.

A single vibro energy mill can be best utilized in a batch dissolving operation as follows. As shown in FIG. 1, the silicate glass particles and hot water are fed into the annular chamber 1, of the mill through the reflux condenser 4. The mill is set in operation to activate the energy transfer media which strike the walls of the mill and each other thereby transmitting the necessary energy to the glass particles causing a cleansing action which is effective in removing the semi-solid from the surface of the particles rather than a grinding action which involves splitting and crushing the particles. The energy transfer media can be any insoluble, inert particulate matter of the proper size and density but usually cylinders of alumina of about ¼ to ¾ of an inch are used. Cubes of alumina at about ¼ to ¾ of an inch are also useful. Other suitable materials include cylinders of flint, stainless steel and other inert metals of high density. The initial charge of silicate glass particles can contain a wide range of particle sizes. The smallest particles dissolve first so that the range of particle size is reduced to the larger particles which have decreased somewhat in size through dissolving. The operation of the mill is controlled so that the impacts of the energy transfer media are of low frequency and high amplitude to supply the necessary energy to aid in the removal and diffusion of the silicate semi-solid silanol groups and silicate ions from the surface of these larger glass particles. As the particles of undissolved glass become smaller the operation of the mill is controlled so that the frequency of the impacts is increased and the amplitude decreased, thereby providing the greater energy necessary for removal and dispersion of the semi-solid from the smaller glass particles. The concentrated alkali metal silicate solution is discharged through a filter or centrifuge to remove the small proportion of very fine glass particles that remain undissolved. These fine glass particles are returned to the hot water inlet and dissolve very rapidly upon re-introduction to the energy mill.

A preferred embodiment of this invention is illustrated in FIG. 2 and is a continuous method for carrying out my invention involving a train or succession of vibro energy mills. Silicate glass particles and hot water are fed in chamber 1a through reflux condenser 4a. This mill is operated at low frequency and high amplitude as required by larger particles. The mill is discharged through a means for classifying particles of varying size such as a screen 9 and the particles that are finer than the mesh of the screen will pass to chamber 1b. The particles that do not pass through the screen are recycled through return 10 to chamber 1a. The mill for chamber 1b is operated so that higher frequency, lower amplitude impacts result. The cycle is repeated through chamber 1c. The discharge 6c from chamber 1c is conducted to a filter or centrifuge 7 to remove the undissolved silicate glass. The fine glass residue is recycled through return 8 to hopper 3. The fine glass is fed with hot water through reflux condenser 4 to chamber 1. The mill for chamber 1 is operated at high frequency and low amplitude and the fine glass particles are readily dissolved in the fresh hot water.

A second preferred embodiment of the invention and also a continuous dissolving process is illustrated in FIG. 3. Crushed silicate glass chunks, cubits, buttons or finer particles are charged to dissolving chamber 30 through hopper 32. In chamber 30 the glass comes in contact with hot alkali metal silicate which is flowing upward from lower chambers with some small glass particles entrained and the slurry of said contacted components are agitated by a slow speed, high pitch impeller 31. The slow speed of the impeller maintains only the smaller particles of silicate glass in suspension in chamber 30. The larger particles of glass pass through the vertical tube 36 to dissolving chamber 30a. In chamber 30a the glass comes in contact with the upward flowing stream of hot alkali metal silicate of lower concentration than in chamber 30 and the slurry is agitated by impeller 31a having a higher speed and lower pitch than the impeller 31. The direction of rotation of impeller 31a may be opposite to that of impeller 31. The glass particles are suspended for a somewhat longer time in chamber 30a and therefore an appreciable dissolution of the glass is achieved and the particle size of the glass is reduced. Any particles that have become fine enough, remain suspended in chamber 30a until they become so small that they are entrained in the upward flow of hot alkali metal silicate solution. The particles that do not remain suspended in chamber 30a pass to chamber 30b where the glass contacts hot alkali metal silicate solution of a still lower concentration. This cycle is repeated in chamber 30c with the glass contacting hot alkali metal silicate solution of still lower concentration and the glass particles becoming smaller. The pitch and speed of the impellers 31b and 31c are designed to cope with the smaller particles that are found in these chambers. The particles that enter chamber 30d from either tubing 36 or the fine glass return 35 are very fine and contact only fresh hot water. The dissolution under these conditions is very rapid. Some very fine particles become entrained in the upward flow of alkali metal silicate solution and pass from chamber 30d to chamber 30c. As the silicate solution passes upward through successive chambers and becomes more concentrated it entrains relatively larger although still quite fine glass particles. The concentrated alkali metal silicate solution is discharged to a centrifuge 34 in which the fine particles of glass are separated and recycled to chamber 30d through return 35. The sparkling clear solution can be passed to storage or any other finishing step necessary. The impeller of the chambers can be arranged so that they rotate in the same direction or they may be so arranged or designed so that successive impellers rotate in opposite direction as shown in the FIG. 3. The opposite rotation of the impellers provides some added agitation in the dissolver and a somewhat better classification of the glass particles.

As can be clearly seen from the above descriptions, several mechanisms serve to help classify the glass particles charged to the dissolvers so that the several sizes of particles can be subjected to the appropriate agitation, concentration of alkali metal silicate solution and/or mechanical energy necessary for rapid dissolution. In general, small particles with fresh surfaces dissolve much faster than larger particles so that after any of the initial dissolving steps described above the larger particles would remain. Then, in the process embodiments involving the vibro energy mills the particle size becomes reduced as the dissolving continues and the mechanical action supplied is varied accordingly. The means of classifying the particles and maintaining them in the proper chambers with the proper concentrations of alkali metal silicate solution is more complex in the apparatus consisting of the vertically stacked dissolving chambers. In this apparatus the classification is maintained by the upward flow of alkali metal silicate solution removing the finest particles, the variable speed and pitch impellers maintaining a certain size particle in suspension and allowing the larger particles to fall to a lower chamber.

The removal and diffusion of the semi-solid silanol groups and silicate ions from the glass surface using the energy mill is accomplished by the mechanical energy transmitted by the media to the glass. The energy supplied is varied as dictated by the particle size of the glass being dissolved. The removal and diffusion of the semi-solid from the glass surfaces using the stacked dissolving chambers is accomplished by varying the concentration of the alkali metal silicate solutions contacting the silicate glass particles which provide varied chemical driving forces for the removal and diffusion of the semi-solid from the glass surface. The more dilute the solution the greater the chemical driving force and in this apparatus the particles that have been subjected to the dissolving process for the longest period of time and are of the smallest size are contacted with very dilute solutions or with fresh hot water. Fresh silicate glass particles generally dissolve more readily than those exposed to the dissolving process for a long period of time and indeed the short dissolving times is one of the important advantages of the invention. The varying agitation supplied by the different impellers speeds and pitches also supply some of the driving force required to effect the removal and diffusion of the semi-solid from the various sized particles of silicate glass.

In the batch operation of the vibro energy mill, best results are obtained by operating the mill at 950 to 1250 impacts/minute for the first quarter of the dissolving time, 1500 to 1900 impacts/minute for the next quarter and 3200 to 3600 impacts/minute for the last half. In carrying out the dissolution continuously in a train of mills, the initial mill processing the largest glass particle is operated at 950 to 1250 impacts/minute, and intermediate mill or mills can be operated between 1500 and 1900 impacts/minute while the mills processing the smallest glass particles are operated at 3200 to 3600 impacts/minsute. The impellers impacts/minute. the chambers in the vertical stack generally rotate at 450 to 2300 rpm. The impeller for the initial or topmost chamber generally rotates at 450 to 600 rpm, while the impeller of the bottom chamber generally rotates at 2000 to 2300 rpm.

The walls of the mills or dissolving chambers are generally insulated and/or jacketed so that the exotherm generated by the dissolution can be conserved and/or the liquid can be heated.

In general the prior art dissolving techniques are subject to many difficulties that are often manifested in the alkali metal silicate solutions realized from such processes. The prior art methods often result in "stickers" which are large agglomerates of hydrated glass that collect because of insufficient and/or inefficient agitation and exposure of the glass to heat and pressure for long periods of time. Such stickers form to a large extent because of the adhesive nature and very high viscosity of the semi-solid layer on the glass surface. At times such stickers result in inhomogeneous solutions and concentrations gradients within such solutions. In such cases the time required for equilibration and dissipation of such gradients can be quite extended. Another problem encountered in silicate solutions dissolved by prior art methods is turbidity caused by tiny particles of dehydrated silica and silicate. Such particles are produced by long exposure to high temperatures for long periods of time as required by the prior art practices. These problems and others can be attributed to the slow dissolving rate encountered as the concentration of the alkali metal silicate increases.

The prior art also requires that excess glass be used to insure sufficient surface and chemical driving force needed to achieve a concentrated silicate solution. The excesses of glass used are usually between 50 and 100%. As a consequence of this practice, portions of the glass used in any particular dissolving charge may have been exposed to several cycles of heat and pressure and consequently such glass particles are hard to dissolve. The process of my invention requires only slight excesses of glass. Excesses of 10 to 20% may be used but usually 5% or less is satisfactory. The process of my invention also provides that glass that remains undissolved through one dissolving cycle be recycled to that point in the process where its immediate dissolution is assured. In this way all the glass charged is dissolved in two dissolving cycles.

As described hereinbefore, the practices of the present invention maintain the dissolving rate at a high level throughout the dissolution and the solutions realized from these practices are homogeneous and sparkling clear. The solutions realized from the processes of the invention can vary between 30 and 50% silicate solids with densities of 35° to 58° Baume. These solutions are useful for any known application for silicate solutions and indeed solutions made according to my invention can be used in certain applications where silicate solutions which contain minute particles of dehydrated silica and/or silicate could not be used.

EXAMPLES

A further understanding of the invention can be obtained from the following examples which illustrate certain embodiments of the invention and should not be considered restrictive. The $SiO_2/M_2O$ ratios are on a mole basis unless otherwise indicated and the mesh sizes are for Tyler series screens.

EXAMPLE 1

Sodium silicate glass particles with a $SiO_2/Na_2O$ ratio of 3.22 and less than 10 mesh were dissolved in the vibro energy mill of FIG. 1. The mill was partly charged with water and the temperature maintained at 96°C. The silicate glass particles were charged with hot water (95°-96°C) in a period of less than 5 minutes. The composition of the total charge was 41.5% glass and 58.5% water. In 10 minutes the density of the solution was 20° Baume. In 15 minutes the density was 35° Baume and in 20 minutes the density was 41° Baume. At this point the mill was discharged, the silicate solution centrifuged to remove less than 10% of small particle size glass. The sparkling clear liquid was cooled and found to contain 8.93% $Na_2O$ and 28.71% $SiO_2$. The following table summarizes the frequency of the impacts of the energy transfer media in the vibro mill during the dissolution.

| Time (minutes) | Frequency(impacts/minute) |
|---|---|
| 0–5 | 1100 |
| 5–10 | 1700 |
| 10–20 | 3400 |

As a comparisons the same composition was charged to the mill but the frequency was maintained at 1100 impacts/minute throughout the dissolution. In 20 minutes the density of the solution was only 30° Baume and in 40 minutes it was only 38° Baume. At a steady frequency of 1700 impacts/minute the density of the solution was 40° Baume in 40 minutes. At an initial rate of 3400 impacts/minute the solution boiled after only a few minutes of processing because of the initial exotherm and the energy provided by the mill.

EXAMPLE 2

The same silicate glass was dissolved in a pressure dissolver as a comparison to Example 1. The dissolution required 3 hours at 15 psig of steam using 50% excess of glass and the resulting solution contained small particles of partly condensed silica. The density was 40.8° Baume and the analysis indicated 8.87% $Na_2O$ and 28.63% $SiO_2$.

The same silicate glass was dissolved in the pressure cooker at 35 psig of steam for 1 hour using a 50% excess of glass. The resulting solution also contained small particles of partly condensed silica. The density was 40.3° Baume and the analysis indicated 8.80% $Na_2O$ and 28.55% $SiO_2$. A portion of the excess glass was a viscous agglomerated mass, a "sticker."

EXAMPLE 3

Sodium silicate glass with a $SiO_2/Na_2O$ ratio of 1.6 and the largest particles of which were about ⅛ inch was dissolved according to the process of Example 1. In 15 minutes the density of the silicate solution was 43° Baume and in 20 minutes the density was 57.9° Baume. At this point the mill was discharged and the solution was centrifuged and cooled. The centrifuge removed about 3.5% of very fine undissolved particles that were recycled in the next batch. The sparkling clear liquid contained 19.58% $Na_2O$ and 31.31% $SiO_2$. The following table summarizes the frequency of the impacts of the energy transfer media in the vibro energy mill during dissolution.

| Time(minutes) | Frequency(impacts/minute) |
|---|---|
| 0–5 | 1100 |
| 5–10 | 1700 |
| 10–20 | 3400 |

EXAMPLE 4

A train of vibro energy mills were arranged as shown in FIG. 2. The mills were operated so that the frequencies of the mills were as follows.

| Chamber No. | Frequency(impacts/minute) |
|---|---|
| 1 | 3400 |
| 1(a) | 1100 |
| 1(b) | 1700 |
| 1(c) | 3400 |

The amplitudes of the impacts were inversely proportional to the frequencies. Sodium silicate glass particles crushed to −10 mesh and with a ratio of 2.35 $SiO_2$/1.00 $Na_2O$ were charged from hopper 3a to chamber 1a through reflux condenser 4a at a rate of 500 lbs/hour. Hot water (95°C) was charged to chamber 1a at a rate of about 35 gallons/hour. Dilute sodium silicate solution entered chamber 1a from chamber 1 at a rate of about 35 gallons/hour. The residence times in chambers 1 and 1a were about 7 minutes while those in the remaining chambers were 3.5 minutes. The chambers were insulated so that the heat from the exotherm generated by the dissolving glass and the energy from the milling maintained temperatures of 95 to 96 in chamber 1a, 97 to 98 in chamber 1b and 100 to 101 in chamber 1c. The discharge from chamber 1a was analyzed and about 60% of the glass had dissolved. Analysis of the discharge from chamber 1b showed about 85% of the glass charged had been dissolved. The product sodium silicate solution was centrifuged and the fine glass particles all of which were less than 325 mesh were recycled to chamber 1. There were about 10 lbs/hour of fine glass particles recovered indicating that only about 2% of the glass charged did not dissolve. These fine glass particles dissolved readily when recycled to chamber 1. The analysis of the water clear solution was 32.03% $SiO_2$ and 13.58% $Na_2O$. The density was 51.0° Baume.

EXAMPLE 5

As a comparison the sodium silicate glass of Example 4 was dissolved in boiling water. A 25% excess of the glass was used, the density of the product solution only reached 46.5° Baume after an hour of dissolving time.

EXAMPLE 6

A potassium silicate glass was dissolved by the method of Example 4. The glass had a mole ratio of 3.2 $SiO_2/1$ $K_2O$ and the glass was charged at a rate of about 240 lbs/hour with the hot water charged through inlets 2 and 2a at about 35 gallons/hour at each inlet. The temperature conditions were somewhat lower but only about 1.5% of the glass remained undissolved and was recycled. The analysis of the sprakling clear solution was 8.31% $K_2O$ and 20.83% $SiO_2$. The density was 29.8° Baume.

EXAMPLE 7

A sodium silicate glass with a ratio of 2.00 $SiO_2/1.00$ $Na_2O$ and a particle size of less than 4 mesh was dissolved in the apparatus shown in FIG. 3. The glass was charged into chamber 30 at a rate of 1500 lbs/hour while hot water at 97°C was charged into inlet 33 at a rate of 150 gallons/hour. The hot water was at 94°–95°C and temperature had risen to 101°C upon entering chamber 30. The impellers had the following speeds.

| Impeller | Speed (rpm) |
|---|---|
| 31 | 550 |
| 31(a) | 700 |
| 31(b) | 1100 |
| 31(c) | 1750 |
| 31(d) | 2100 |

The product was centrifuged upon discharge from the dissolver and about 45 lbs/hour of fine glass were recovered and recycled to chamber 30d where it dissolved readily. The sparkling clear product had 17.97% $Na_2O$ and 36.01% $SiO_2$.

In addition to the examples described herein, other variations within the scope of the invention and the depending claims would occur to those skilled in the art and must be regarded as within the scope of the invention.

I claim:

1. In the known process of dissolving alkali metal silicate glass in water at elevated temperatures to form alkali metal silicate solutions, the improvement allowing the formation of homogeneous and sparkling clear alkali metal silicate solutions and comprising:
   a. contacting particles of said alkali metal silicate glass with water at temperatures between 80°C and the boiling point of the solutions formed and at atmospheric pressure thereby forming: a solid phase; a semi-solid phase adhering to the surface of the glass particles and consisting of silanol groups, silicate ions and water; and an aqueous phase in a series of annular chambers of vibrating mills, said annular chambers being charged with energy transfer media which consists of insoluble, inert particulate matter;
   b. operating said vibrating mills so that said energy transfer media impact among themselves, with the walls of said chamber, and with said glass particles; thereby supplying gentle abrasive action which promotes the constant removal of said semi-solid phase from the solid phase and diffusion into said aqueous phase to expose nascent glass surfaces which on contact with water form additional semi-solid phase adhering to the surfaces of said glass particles, and
   c. intensifying the operation of said vibrating mills so that the impacts of said energy transfer media increase as the particle size of the alkali metal silicate glass becomes reduced
   d. contacting said alkali metal silicate glass with hot water and dilute silicate solution from mill 1 as described hereafter in the chamber of the second vibrating mill of said train;
   e. operating said mill so that the impacts of said energy transfer media are 950 to 1250 per minute;
   f. discharging the solution and aqueous phase formed in said second mill and the undissolved glass particles through a means for classification whereby the glass particles and aqueous phase that pass through said classification means enter the chamber of the third mill of said train while the particles that do not pass through said classification means are returned to the chamber of the second mill;
   g. operating said third mill so that the impacts of said energy transfer media are 1500 to 1900 per minute;
   h. discharging the solution and aqueous phase formed in said third mill and the undissolved glass particles through means for classification whereby the glass particles and aqueous phase that pass through said classification means enter the chamber of the fourth mill of said train while the particles that do not pass through said classification means are returned to the chamber of the third mill;
   i. operating said fourth mill so that the impacts of said energy transfer media are 3200 to 3600 per minute;
   j. discharging the solution and aqueous phase formed in said fourth mill through a means for separating the remaining undissolved glass particles from the aqueous phase which is the product solution;
   k. charging the glass particles from step j to the first mill of said train;

l. contacting said glass particles with hot water and operating said first mill so that the impacts of said energy transfer media are 3200 to 3600 per minute whereby said particles are dissolved completely; and, m. discharging the dilute solution formed in said first mill into the second mill and continuing the process as described in step d.

2. The process of claim 1 wherein the energy transfer media consists of inert particles selected from the group consisting of alumina, flint and stainless steel.

3. The process of claim 2 wherein the inert particles are cylinders having dimensions no larger than ¼ to ¾ of an inch.

4. The process of claim 2 wherein the inert particles are cubes of about ¼ to ¾ of an inch.

5. The process of claim 1 wherein additional mills are employed in the train of mills.

6. The process of claim 1 wherein the alkali metal silicate glass particles have a $SiO_2/M_2O$ mole ratio between 1.2/1.0 and 3.8/1.0, A particle size of ½ inch or smaller and are selected from a group consisting of sodium silicate, potassium silicate and sodium-potassium double silicate.

7. The process of claim 1 in which the temperature is between 95° and 102°C.

* * * * *